(No Model.)

T. A. EDISON.
DYNAMO ELECTRIC MACHINE.

No. 297,587. Patented Apr. 29, 1884.

ATTEST:
E. C. Rowland
A. W. Seely

INVENTOR:
Thomas A. Edison
By Rich'd N. Dyer
Atty.

UNITED STATES PATENT OFFICE.

THOMAS A. EDISON, OF MENLO PARK, NEW JERSEY.

DYNAMO-ELECTRIC MACHINE.

SPECIFICATION forming part of Letters Patent No. 297,587, dated April 29, 1884.

Application filed December 12, 1883. (No model.)

*To all whom it may concern:*

Be it known that I, THOMAS A. EDISON, of Menlo Park, in the county of Middlesex and State of New Jersey, have invented a new and useful Improvement in Dynamo-Electric Machines, (Case No. 597,) of which the following is a specification.

In my application No. 587 (Serial No. 108,556) I have set forth means for balancing the armature-shaft of a dynamo-electric machine in its bearings, so that it is free to move longitudinally in either direction, whereby the efficient lubrication of the bearings and the even wearing of the journals and the commutator-cylinder are secured.

This invention relates to other means for accomplishing the same object. In the present case, as in that above referred to, I prefer to use a spring bearing against an end of the armature-shaft to produce the tendency in one direction of the shaft; but to balance this tendency I make use of the magnetic attraction of the field-magnet of the machine by so placing and constructing the driving-pulley that said pulley is nearly removed from the magnetic field, the attraction between the magnet-poles and the pulley sufficing merely to produce enough opposing tendency to the spring to balance its pressure. To accomplish this I prefer to make the pulley partly of magnetic and partly of non-magnetic material, the magnetic part being so proportioned and located that its attraction toward the poles will suffice to produce the result above specified. The shaft, being thus balanced, oscillates slightly in its bearings. The lubricating-oil is thus spread evenly upon the bearings, and grooves are not worn in the journals by grit or hard particles, which may enter them, or on the commutator-cylinder by the brushes.

Instead of the spring bearing against the end of the shaft, other means may be employed to balance the attraction of the magnet-poles. The machine might be set at a very slight inclination to produce a tendency for the shaft to slide slightly downward; or the alignment of the machine and its driving-motor might be such that the draft of the belt will oppose the magnetic attraction.

Figure 1:
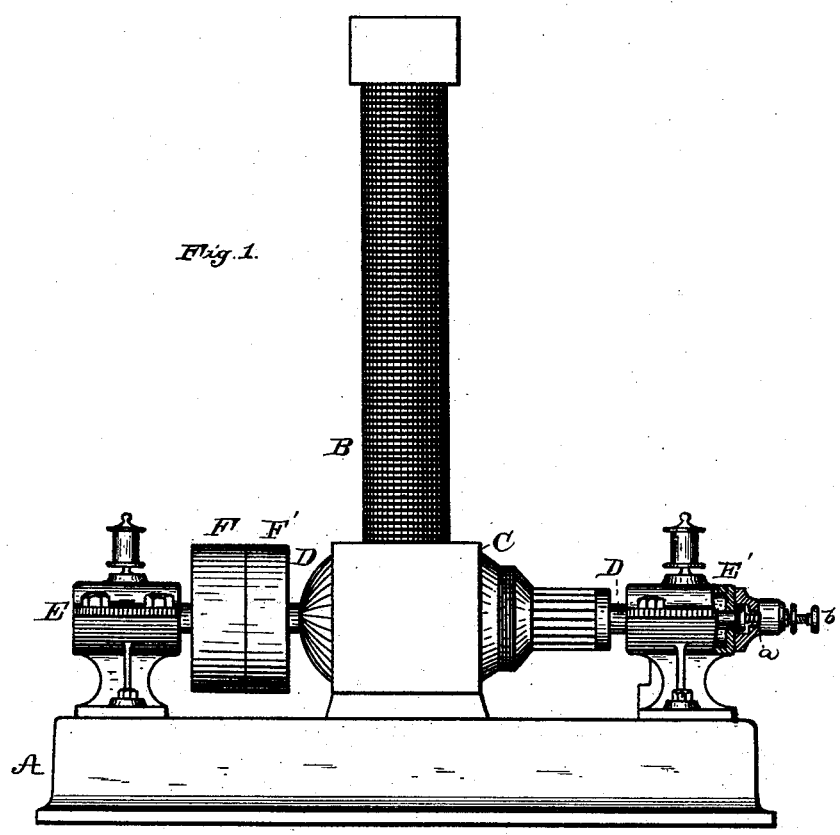
Figure 2:
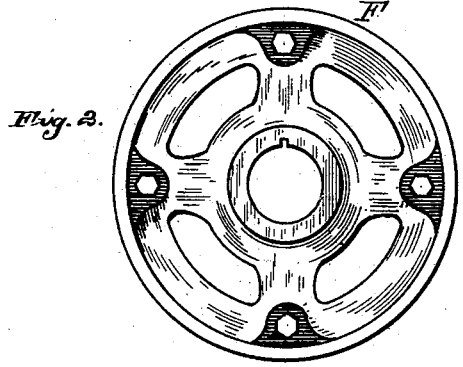
Figure 3:
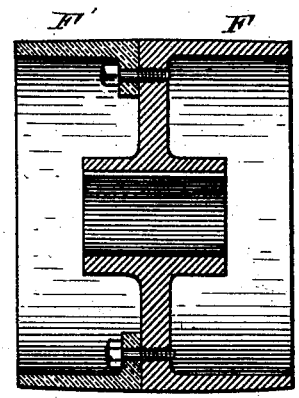

My invention is illustrated in the accompanying drawings, in which Figure 1 is a view of a dynamo-electric machine embodying said invention; Fig. 2, an end view of the driving-pulley, and Fig. 3 a section thereof.

A is the bed-plate, B the field-magnet, C the armature, and D the armature-shaft, of a dynamo-electric machine. The shaft is supported in journal-boxes E E'. In the box E' is placed a spring, $a$, which presses against the end of the shaft D, and whose tension is adjusted by means of set-screw $b$. The driving-pulley on the armature-shaft is made in two parts, bolted together—one, F, of iron or other magnetic metal, the other, F', of brass or other non-magnetic material. Preferably the magnetic portion F is placed on the side away from the magnet, so as to remove it farther from the magnetic field; but if it is made smaller it may be placed nearer the magnet. The attraction between the field-magnet poles and the part F of the pulley balances the pressure of the spring on the shaft, and the shaft is thus free to slightly oscillate longitudinally in its bearings.

What I claim is—

1. The combination, with a dynamo-electric machine, of means opposing the attraction of the driving-pulley by the field-magnet of the machine, substantially as set forth.

2. The combination, with a dynamo-electric machine, of a spring bearing on the end of the armature-shaft and opposing the attraction of the driving-pulley by the field-magnet, substantially as set forth.

3. The combination, with a dynamo-electric machine, of a driving-pulley nearly removed from the attraction of the field-magnet, and means opposing the slight attractive influence of said magnet upon said pulley, substantially as set forth.

4. The combination, with a dynamo-electric machine, of a driving-pulley partly of magnetic and partly of non-magnetic material, substantially as set forth.

5. The combination, with a dynamo-electric machine, of a driving-pulley partly of magnetic and partly of non-magnetic material, and means opposing the attraction of the field-magnet for said pulley, substantially as set forth.

6. The combination, with a dynamo-electric machine, of a driving-pulley partly of magnetic and partly of non-magnetic material, and a spring opposing the attraction of said pulley by the field-magnet of the machine, substantially as set forth.

This specification signed and witnessed this 15th day of November, 1883.

THOS. A. EDISON.

Witnesses:
 H. W. SEELY,
 EDWARD H. PYATT.